US008457388B2

(12) United States Patent
Chen et al.

(10) Patent No.: US 8,457,388 B2
(45) Date of Patent: Jun. 4, 2013

(54) METHOD AND SYSTEM FOR SEARCHING FOR GLOBAL MINIMUM

(75) Inventors: Wen-Chao Chen, Kaohsiung (TW); Zen Chen, Taipei (TW); Chiao-Wen Cheng, Hualien County (TW)

(73) Assignee: Industrial Technology Research Institute, Hsinchu (TW)

( * ) Notice: Subject to any disclaimer, the term of this patent is extended or adjusted under 35 U.S.C. 154(b) by 960 days.

(21) Appl. No.: 12/534,861

(22) Filed: Aug. 4, 2009

(65) Prior Publication Data

US 2010/0166295 A1 Jul. 1, 2010

(30) Foreign Application Priority Data

Dec. 31, 2008 (TW) ................ 97151864 A

(51) Int. Cl.
*G06K 9/00* (2006.01)
(52) U.S. Cl.
USPC ........... 382/154; 382/225; 382/128; 382/132; 716/19; 716/21; 716/52; 703/2; 703/6; 703/11; 703/12
(58) Field of Classification Search
USPC ........... 382/154, 225, 128; 716/19, 21; 703/2, 703/6, 11.12; 355/67, 55, 57; 430/311, 312, 430/323
See application file for complete search history.

(56) References Cited

U.S. PATENT DOCUMENTS

| 6,661,908 B1 | 12/2003 | Suchard et al. |
| 6,816,187 B1 | 11/2004 | Iwai et al. |
| 6,993,450 B2 | 1/2006 | Takemoto et al. |
| 7,133,570 B1 | 11/2006 | Schreier et al. |
| 7,333,133 B2 | 2/2008 | Chang et al. |
| 7,587,702 B2 * | 9/2009 | Rosenbluth ............ 716/52 |
| 7,685,559 B2 * | 3/2010 | Rosenbluth ............ 716/52 |
| 2008/0002023 A1 | 1/2008 | Cutler |
| 2008/0184189 A1 * | 7/2008 | Rosenbluth ............ 716/19 |
| 2009/0199150 A1 * | 8/2009 | Rosenbluth ............ 716/19 |

FOREIGN PATENT DOCUMENTS

| EP | 1266337 | 12/2002 |
| TW | 410304 | 11/2000 |
| TW | 561776 | 11/2003 |

OTHER PUBLICATIONS

Mark J Post, Minimum Spanning Ellipsoids, Department of Electrical Engineering arid. Computer Science The Jones Hopkins Univetsity, 1984 ACM, pp. 108-116, published 1984.*
Rommy shioda and Levent Tuncel, Clustering Via minimum volume Ellipsoids, corr, Dec. 2005, AMS Subject calssification 90C22,90C11, published Mat 25,2005, pp. 1-35.*

(Continued)

*Primary Examiner* — Mekonen Bekele
(74) *Attorney, Agent, or Firm* — Jianq Chyun IP Office

(57) ABSTRACT

A method and a system for searching for a global minimum are provided. First, a subclass of a plurality of space points in a multidimensional space is clustered into a plurality of clusters through a clustering algorithm, wherein each of the space points is corresponding to an error value in an evaluation function. Then, ellipsoids for enclosing the clusters in the multidimensional space are respectively calculated. Next, a designated space corresponding to each of the ellipsoids is respectively inputted into a recursive search algorithm to search for a local minimum among the error values corresponding to the space points within each designated space. Finally, the local minimums of all the clusters are compared to obtain the space point corresponding to the minimum local minimum.

23 Claims, 4 Drawing Sheets

OTHER PUBLICATIONS

Mark J Post, Minimum Spanning Ellipsoids, Department of Electrical Engineering arid. Computer Science The Jones Hopkins Univetsity, 1984 ACM, pp. 108-116, published 1984.*

"Office Action of Taiwan Counterpart Application", issued on Mar. 19, 2013, p1-p3, in which the listed references were cited.

* cited by examiner

METHOD AND SYSTEM FOR SEARCHING FOR GLOBAL MINIMUM

CROSS-REFERENCE TO RELATED APPLICATION

This application claims the priority benefit of Taiwan application serial no. 97151864, filed Dec. 31, 2008. The entirety of the above-mentioned patent application is hereby incorporated by reference herein and made a part of specification.

BACKGROUND

1. Technical Field

The disclosure generally relates to a method for searching for a minimum, and more particularly, to a method and a system for searching for a global minimum.

2. Description of Related Art

Camera pose estimation has become a very important subject in recent years, wherein the rotation and translation information of a camera in regard to a specific coordinate system is estimated by using images, and the rotation and translation information can be used in space localization applications, such as human face recognition, access control system, 3D image reconstruction, robot vision, and visual simultaneous localization and mapping technique, in the computer vision technique.

Estimation accuracy is one of the most important indexes in camera pose estimation. A camera pose estimation technique is practical only when the accuracy thereof reaches a certain level. However, the estimation accuracy will be reduced if the original data contains too many noises.

SUMMARY

Accordingly, the disclosure is directed to a method and a system for searching for a global minimum, wherein space points are clustered and a local minimum in each of the clusters is searched for to obtain the space point corresponding to the minimum of the local minimums.

The disclosure provides a global minimum searching method. First, a subclass of a plurality of space points in a multidimensional space is clustered into a plurality of clusters through a clustering algorithm, wherein each of the space points is corresponding to an error value in an evaluation function. Then, ellipsoids for enclosing the clusters in the multidimensional space are respectively calculated. Next, a designated space corresponding to each of the ellipsoids is respectively inputted into a recursive search algorithm to search for a local minimum among the error values corresponding to the space points within each designated space. Finally, the local minimums of all the clusters are compared to obtain the space point corresponding to the minimum of the local minimums.

The disclosure also provides a global minimum searching system including a clustering module, a calculation module, and a search module. The clustering module clusters a subclass of a plurality of space points in a multidimensional space into a plurality of clusters through a clustering algorithm, wherein each of the space points is corresponding to an error value in an evaluation function. The calculation module respectively calculates ellipsoids for enclosing the clusters in the multidimensional space. The search module respectively inputs a designated space corresponding to each of the ellipsoids into a recursive search algorithm to search for a local minimum among the error values corresponding to the space points within each designated space, and the search module compares these local minimums to obtain the space point corresponding to the minimum of the local minimums.

As described above, in the disclosure, space points in a multidimensional space are first clustered, and ellipsoids for respectively enclosing these clusters are then calculated. After that, a local minimum in each of the ellipsoids is searched for through a recursive search algorithm, so as to obtain the space point corresponding to the minimum of the local minimums.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
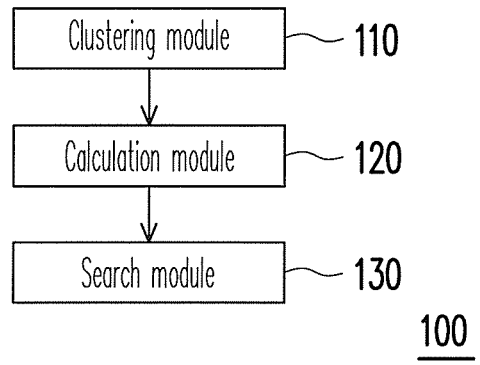
FIG. 1 is a block diagram of a global minimum searching system according to a first embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

First Embodiment

FIG. 1 is a block diagram of a global minimum searching system according to the first embodiment of the disclosure. Referring to FIG. 1, the global minimum searching system 100 includes a clustering module 110, a calculation module 120, and a search module 130.

The clustering module 110 clusters a subclass of a plurality of space points in a multidimensional space into a plurality of clusters through a clustering algorithm, wherein each of the space points is corresponding to an error value in an evaluation function. The clustering algorithm may be a minimum spanning tree (MST) algorithm or a K-means algorithm. In the present embodiment, a local minimum converging toward a global minimum among the error values and a space point corresponding to the local minimum are obtained with acceptable time and complexity.

The multidimensional space is very complicated and which may contain many local minimums. Thus, the space points are clustered into a plurality of clusters based on their Euclidean distances to obtain an area range which may contain the global minimum.

The calculation module 120 respectively calculates a plurality of ellipsoids for respectively enclosing the clusters in the multidimensional space. Namely, each ellipsoid encloses a cluster, so that the search area can be reduced to the area around the center of the ellipsoid.

The search module 130 respectively inputs a designated space corresponding to each of the ellipsoids into a recursive search algorithm to search for the local minimum among the error values corresponding to the space points within each designated space, and the search module 130 compares these local minimums to obtain the space point corresponding to the minimum of the local minimums.

In the present embodiment, a designated space is a space extended outwards from the center of an ellipsoid. For example, assuming the ellipsoid has a center point e on the $i^{th}$ axis, a designated range between e−d and e+d is obtained by respectively adding and subtracting a distance d from the center point e. A designated space is obtained according to the designated range on each axis.

After the designated space is determined, the search module 130 searches for a local minimum in the designated space through a recursive search algorithm. In other words, the center point of the ellipsoid is considered an initial solution, and after the initial solution is found, a more accurate solution (i.e., a space point corresponding to a smaller error value) is searched for around the initial solution through the recursive search algorithm.

Figure 2:
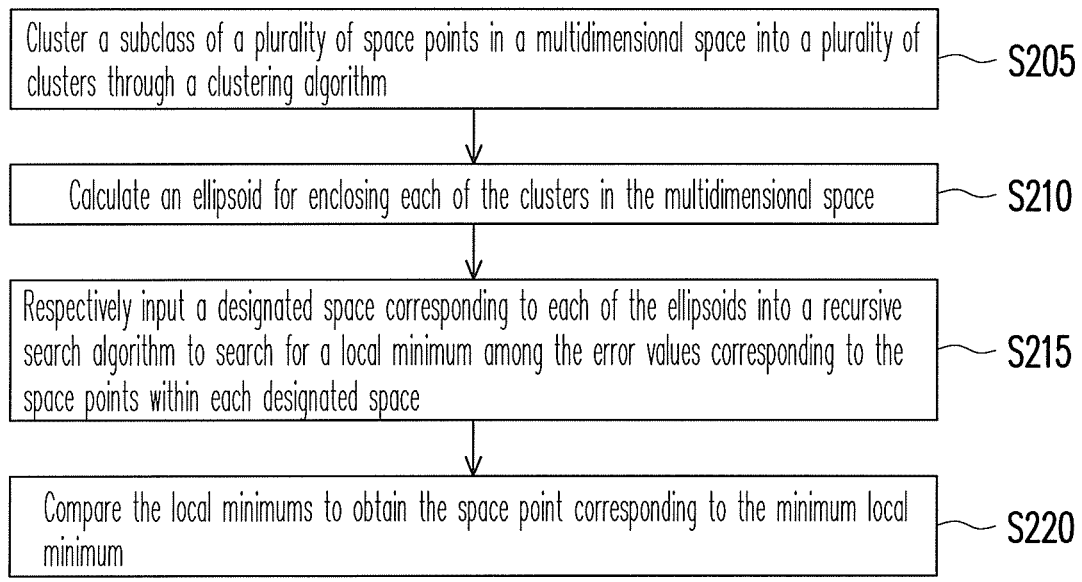
FIG. 2 is a flowchart of a global minimum searching method according to the first embodiment of the disclosure.

The steps for searching for a global minimum will be described below with reference to the global minimum searching system 100. FIG. 2 is a flowchart of a global minimum searching method according to the first embodiment of the disclosure. Referring to both FIG. 1 and FIG. 2, in step S205, the clustering module 110 clusters a subclass of space points in a multidimensional space into a plurality of clusters through a clustering algorithm.

Then, in step S210, the calculation module 120 respectively calculates ellipsoids for respectively enclosing the clusters in the multidimensional space. For example, a covariance matrix is calculated as following by using the space points of each cluster:

$$\sum = \frac{1}{n}\sum_{i=1}^{n}(x_i - \text{mean})(x_i - \text{mean})^T.$$

In foregoing expression, n represents a total number of the space points, mean represents a mean value of the n space points, and $x_i$ represents the $i^{th}$ space point. Next, the calculation module 120 calculates an eigenvalue, an eigenvector, and a mean value of each axis in each of the ellipsoids. The length of each axis in the ellipsoid can be defined as:

The length of longest axis in the ellipsoid $= \sqrt{eigenvalue_{max}} \sqrt{c_{max}}$;

$$\sqrt{c_{max}} = \max\left\{\sqrt{c_i} = \sqrt{(x_i - \text{mean})^T \sum^{-1} (x_i - \text{mean})}, i = 1 \wedge n\right\}.$$

In foregoing expression, $\sqrt{c_{max}}$ represents the maximum value among the Mahalanobis distances of spaces points within each of the clusters, and the lengths of the other axes are calculated according to the value of $\sqrt{eigenvalue}$.

Thereafter, in step S215, the search module 130 respectively inputs the designated space corresponding to each ellipsoid into the recursive search algorithm to search for the local minimum among the error values corresponding to the space points within each designated space. Finally, in step S220, the search module 130 compares these local minimums of the clusters to obtain the space point corresponding to the minimum of the local minimums.

Generally speaking, the golden section search (GSS) algorithm is an algorithm for searching for an optimal solution in a linear space. The difference between the GSS algorithm and a binary search algorithm is that in the GSS algorithm, the golden ratio $\gamma \approx 0.382$ is always used as the section ratio such that the optimal solution can be obtained at a geometric rate. However, the conventional GSS algorithm is only applicable to a unimodal function. Namely, the accurate value can only be found through the GSS algorithm when there is only one maximum or minimum within the search range. Accordingly, the GSS algorithm is not applicable to non-linear spaces or non-unimodal functions.

In the present embodiment, the recursive search algorithm is a revision of the conventional GSS algorithm, wherein an optimal solution can be obtained even in a non-linear space or a non-unimodal function. The recursive search algorithm will be described in detail below.

In a multidimensional space, after each axis is fixed to a single value, one space point in the multidimensional space is then composed of these values, and accordingly an error value corresponding to the space point is obtained. In the present embodiment, each of the axes is sequentially selected and fixed to a single value according to an execution order.

The execution order is determined according to the eigenvalues of the axes. This is because the greater an eigenvalue is, the more complicated the error surface on the corresponding axis is, and accordingly the more difficult it is to find the local minimum. Contrarily, the smaller the eigenvalue is, the simpler the error surface on the corresponding axis is (which may even be close to a unimodal function), and accordingly the easier it is to find the local minimum. The execution order may be determined by placing an axis having a greater eigenvalue before an axis having a smaller eigenvalue or by placing an axis having a smaller eigenvalue before an axis having a greater eigenvalue.

Assuming the multidimensional space has N dimensions, after the execution order is determined, a plurality of sectional values is obtained from the first axis according to the execution order, and local minimums in a space having N−1 dimensions are respectively searched for by serving these sectional values respectively as the single value of the first axis. Next, in the space having N−1 dimensions, a plurality of sectional values is obtained from the second axis according to the execution order, and local minimums in a space having N−2 dimensions are respectively searched for by serving these sectional values respectively as the single value of the second axis. The process goes on until the last axis in the execution order is processed.

Taking a 2D space with an axis x and an axis y as an example, herein it is assumed that an evaluation function of the 2D space is F(x, y), the axis x is the first axis in the execution order, and the axis y is the second axis in the execution order. In addition, it is assumed that four sectional values are respectively obtained within the designated range on each axis.

First, four sectional values $x_1$, $x_2$, $x_3$, and $x_4$ are obtained from the axis x, and the four sectional values are respectively fixed to search for the local minimums of $F(x_1, y)$, $F(x_2, y)$, $F(x_3, y)$, and $F(x_4, y)$, wherein for example the sectional values $x_1$ and $x_4$ are two end values of the designated range on the axis x, $x_2 = x_1 + \gamma(x_4 - x_1)$, and $x_3 = x_1 + (1-\gamma)(x_4 - x_1)$.

Regarding $F(x_i, y)$, it is to search for the local minimum of $F(x_i, y)$ by fixing the axis x to $x_1$. Similarly, four sectional values $y_1, y_2, y_3$, and $y_4$ are obtained from the axis y, such that four space points $(x_1, y_1), (x_1, y_2), (x_1, y_3), (x_1, y_4)$ can be obtained. By bringing these space points into the evaluation function, four error values $F(x_1, y_1), F(x_1, y_2), F(x_1, y_3)$, and $F(x_1, y_4)$ can be calculated, wherein for example $y_1$ and $y_4$ are two end values of the designated range on the axis y, $y_2 = y_1 + \gamma(y_4 - y_1)$, and $y_3 = y_1 + (1-\gamma)(y_4 - y_1)$ Next, whether to obtain a subclass within the designated range on the axis y to re-execute the recursive search algorithm is determined. For example, this may be determined according to whether the length of the designated range is smaller than a predetermined threshold. If the length of the designated range is not smaller than the predetermined threshold, the error values $F(x_1, y_1), F(x_1, y_2), F(x_1, y_3)$, and $F(x_1, y_4)$ are compared to obtain a subspace sub1_y or two subspaces sub1_y and sub2_y within the designated range on the axis y, so as to further reduce the search area. This step of reducing the search area will be described in detail later on.

Thereafter, if only the subspace sub1_y is obtained within the designated range on the axis y, four sectional values sub_$y_1$, sub_$y_2$, sub_$y_3$, and sub_$y_4$ are obtained within the designated range of the subclass sub_y, so as to obtain four error values $F(x_1, sub\_y_1), F(x_1, sub\_y_2), F(x_1, sub\_y_3)$, and $F(x_1, sub\_y_4)$. After that, whether the length of the designated range of the subspace sub1_y is smaller than the predetermined threshold is determined to determine whether to obtain another subspace within the subspace sub1_y on the axis y and re-execute the recursive search algorithm. Assuming the length of the designated range of the subspace sub1_y is smaller than the predetermined threshold, a median sub1_$y_m$ in the designated range of the subspace sub1_y as the single value of the axis y. Accordingly, $F(x_1, sub1\_y_m)$ is determined as the local minimum of $F(x_1, y)$.

The local minimums of $F(x_2, y)$, $F(x_3, y)$, and $F(x_4, y)$ can be obtained through the same method. Similarly, after the local minimums of $F(x_1, y)$, $F(x_2, y)$, $F(x_3, y)$, and $F(x_4, y)$ are obtained, whether the length of the designated range on the axis x is smaller than the predetermined threshold is determined to determine whether to further reduce the search area, namely, whether to obtain a subspace sub1_x or two subspaces sub1_x and sub2_x within the designated range on the axis x and re-execute the recursive search algorithm is determined.

Figure 3:
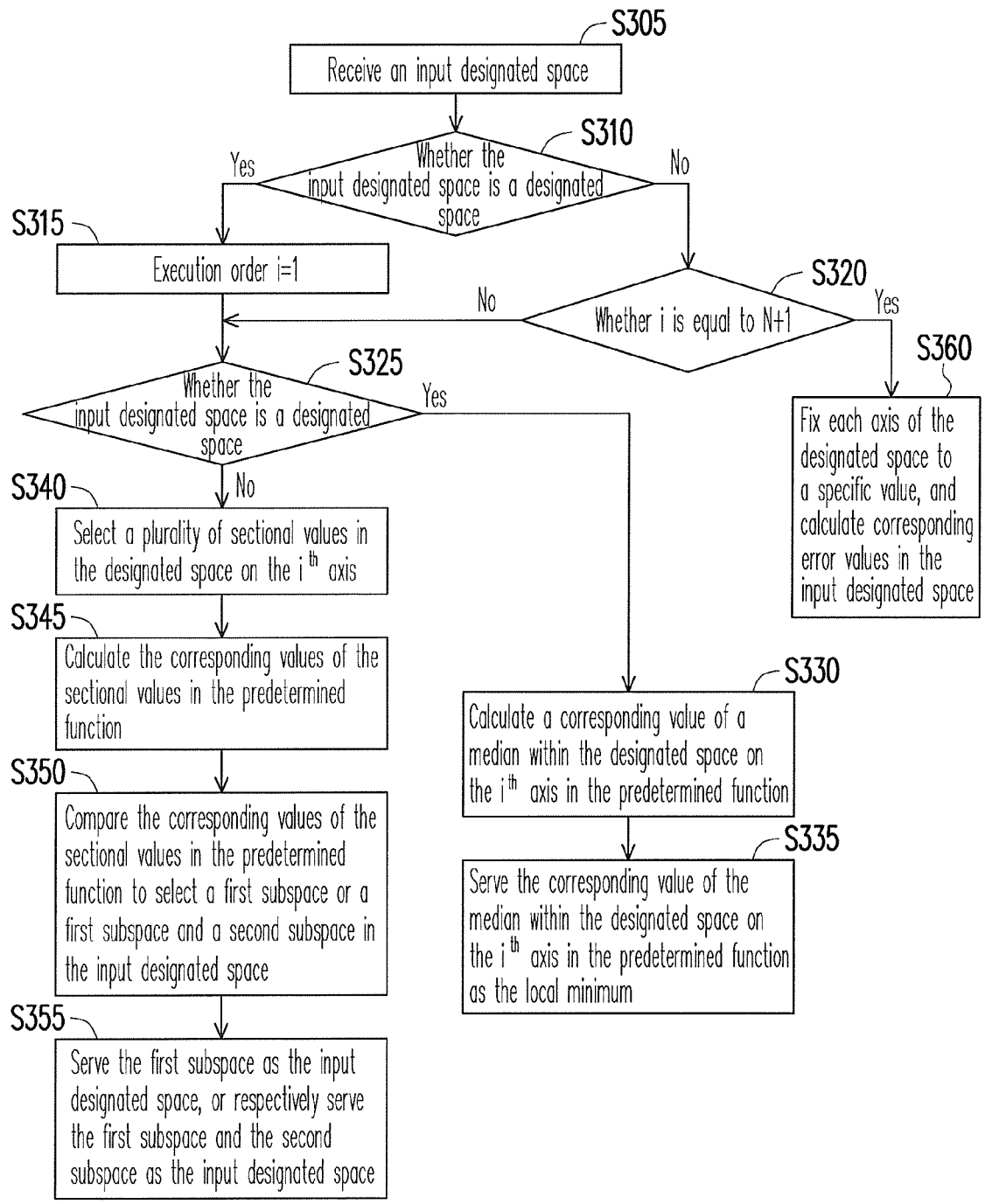
FIG. 3 is a flowchart illustrating the execution of a recursive search algorithm according to the first embodiment of the disclosure.

The recursive search algorithm will be further described with reference to another example. FIG. 3 is a flowchart illustrating the execution of a recursive search algorithm according to the first embodiment of the disclosure.

Referring to FIG. 3, first, in step S305, an input designated space is received, wherein the input designated space is a subclass of a designated space of one of the ellipsoids. Then, in step S310, whether the input designated space is the designated range of one of the ellipsoids is determined. To be specific, in the input designated space, all the designated ranges of those axes having their execution orders smaller than i are single values, and all the designated ranges of the other axes are value ranges, wherein i is a positive integer smaller than or equal to N+1. If the input designated space is equal to one of the designated spaces, in step S315, the execution order i is set to 1 and the process continues to execute step S325.

In other words, when the recursive search algorithm is just started to be executed, the input designated space is the designated range of an ellipsoid, and after every execution of the recursive search algorithm, the designated space is reduced to a subclass thereof. Namely, the designated space is originally a space having N dimensions, and after every execution of the recursive search algorithm, the designated space is reduced to a subspace having fewer dimensions.

If the input designated space is a subclass of a designated space, in step S320, whether i is equal to N+1 is determined to determine whether the recursive search algorithm has been executed on all the axes.

If i is not equal to N+1, in step S325, whether the length of the designated range on the $i^{th}$ axis of the input designated space is smaller than the predetermined threshold is determined to determine when to stop executing the recursive search algorithm on the $i^{th}$ axis.

If the length of the designated range on the $i^{th}$ axis of the input designated space is smaller than the predetermined threshold (i.e., there is no need to execute the recursive search algorithm anymore), in step S330, a corresponding value of a median within the designated range on the $i^{th}$ axis in a predetermined function is calculated. After that, in step S335, the corresponding value of the median within the designated range on the $i^{th}$ axis in the predetermined function is served as the local minimum of the input designated space. The local minimum of the input designated space is the search result of a current recursion and which is sent back to an upper level recursion of the recursive search algorithm. How to calculate the corresponding value in the predetermined function will be explained later on.

If the length of the designated range on the $i^{th}$ axis of the input designated space is greater than the predetermined threshold, in step S340, a plurality of sectional values is selected within the designated range on the $i^{th}$ axis. After that, in step S345, a corresponding value of each sectional value in the predetermined function is calculated. The sectional values include two end values of the designated range on the $i^{th}$ axis of the input designated space, and the other sectional values are generated according to foregoing two end values and a predetermined ratio (for example, the golden ratio 0.382).

Thereafter, in step S350, the corresponding values of the sectional values in the predetermined function are compared to select a first subspace or a first subspace and a second subspace in the input designated space, wherein the input designated space is equal to the first subspace plus the second subspace, and a junction between the first subspace and the second subspace on the $i^{th}$ axis of the input designated space is one of the sectional values.

Next, in step S355, if only the first subspace is selected, the first subspace is inputted into the recursive search algorithm to search for a local minimum of the first subspace, and the local minimum of the first subspace is served as the local minimum of the input designated space. On the other hand, if both the first subspace and the second subspace are selected, the first subspace and the second subspace are respectively inputted into the recursive search algorithm to respectively search for the local minimums of the first subspace and the second subspace, and the smaller local minimum is served as the local minimum of the input designated space.

If it is determined in step S320 that i is equal to N+1, in step S360, because by now the recursive search algorithm has been executed on every axis in the ellipsoid, the designated range on each axis is a fixed single value, and the input designated space is already reduced to a space point with a corresponding error value. Thus, the recursive search algorithm needs not to be executed anymore. Accordingly, the error value corresponding to the input designated space is served as the local minimum of the input designated space. This local minimum of the input designated space is the search result of the current recursion and which is sent back to an upper level recursion of the recursive search algorithm.

Figure 4:
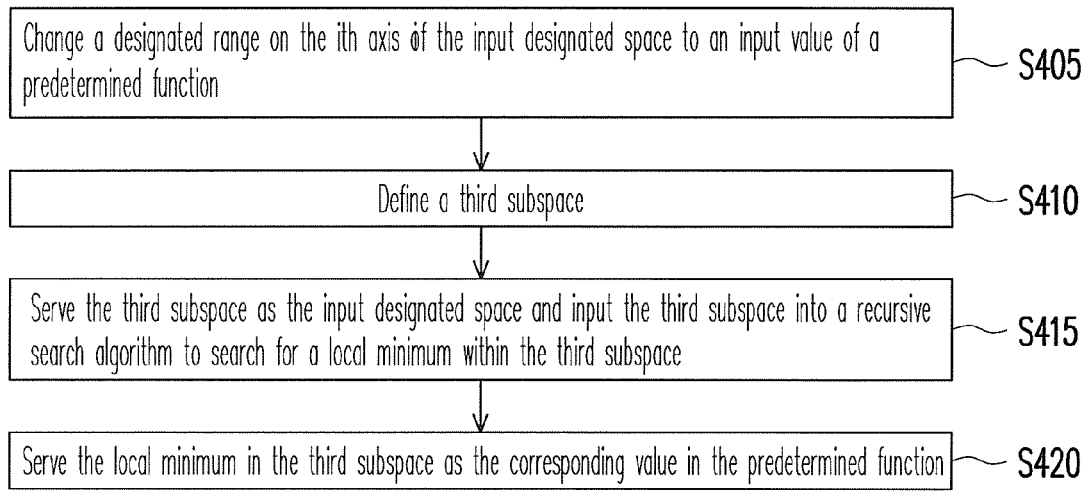
FIG. 4 is a flowchart illustrating how to calculate a corresponding value of a predetermined function according to the first embodiment of the disclosure.

The steps for calculating the corresponding value in the predetermined function will be described with reference to another embodiment of the disclosure. FIG. 4 is a flowchart illustrating how to calculate the corresponding value in a predetermined function according to the first embodiment of the disclosure.

Referring to FIG. 4, first, in step S405, the designated range on the $i^{th}$ axis of the input designated space is changed to an input value of the predetermined function. Herein the input value is the median or one of the sectional values in the designated range on the $i^{th}$ axis. Then, in step S410, the input designated space updated in step S405 is defined as a third subspace.

For example, assuming the median in the designated range on the first axis is α (i.e., the designated range on the first axis is reduced to a single value α), the third subspace defined herein is a space having N−1 dimensions and the first axis thereof being α. Besides, assuming the sectional value in the designated range on the first axis is b (i.e., the designated range on the first axis is reduced to a single value b), the third subspace defined herein is a space having N−1 dimensions and the first axis thereof being b.

After that, in step S415, the third subspace is inputted into the recursive search algorithm to search for the local minimum of the third subspace. Namely, the third subspace is served as the input designated space and inputted into the recursive search algorithm. Finally, in step S420, the local minimum of the third subspace is served as the corresponding value of the predetermined function.

A simple example will be described herein. Herein it is assumed that an ellipsoid has 3 axes $R_x$, $R_y$, and $R_z$, the execution order thereof is $R_x$, $R_y$, and $R_z$, and the ellipsoid has a center point $(e_x, e_y, e_z)$. The designated range on the axis $R_x$ is $e_x-d \sim e_x+d$, the designated range on the axis $R_y$ is $e_y-d \sim e_y+d$, and the designated range on the axis $R_z$ is $e_z-d \sim e_z+d$, wherein d is a predetermined value. Namely, a designated space S is $(e_x-d \sim e_x+d, e_y-d \sim e_y+d, e_z-d \sim e_z+d)$.

First, the designated space S is served as the input designated space, and herein i=1. Then, whether the length of the designated range on the first axis (i.e., the axis $R_x$) in the execution order is smaller than a predetermined threshold is determined. If the length of the designated range on the axis $R_x$ is not smaller than the predetermined threshold, four sectional values $x_1$, $x_2$, $x_3$, and $x_4$ are selected within the designated range on the axis $R_x$ to calculate the corresponding values of the four sectional values in the predetermined function, wherein $x_1$ and $x_4$ are two end values of the designated range on the axis $R_x$.

To calculate the corresponding value of the sectional value $x_1$ in the predetermined function, first, the designated range on the axis $R_x$ is changed to an input value of the predetermined function (i.e., the designated range on the axis $R_x$ is changed to the sectional value $x_1$), and a subspace$(x_1, e_y-d \sim e_y+d, e_z-d \sim e_z+d)$ is selected within the designated space and defined as a third subspace. After that, the third subspace is inputted into the recursive search algorithm to calculate a local minimum of the third subspace. Accordingly, the local minimum of the third subspace$(x_1, e_y-d \sim e_8+d, e_z-d \sim e_z+d)$ is the corresponding value of the sectional value $x_1$ in the predetermined function. Namely, the third subspace $(x_1, e_y-d \sim e_y+d, e_z-d \sim e_z+d)$ is served as the input designated space and inputted into the recursive search algorithm to execute foregoing steps S305~S360 repeatedly. Thus, to calculate the corresponding value in the predetermined function, the designated range on each axis is recursively fixed to a single value to obtain the corresponding error value and accordingly the local minimum.

Figure 5A:
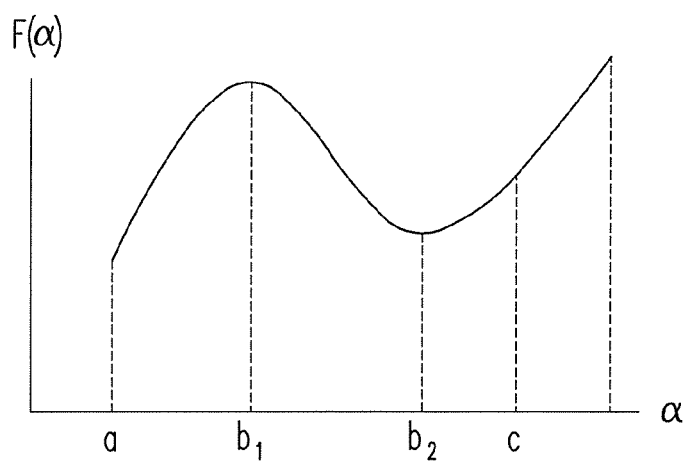
FIG. 5A and FIG. 5B respectively illustrate the curve of a predetermined function within a designated range on an $i^{th}$ axis according to the first embodiment of the disclosure.
Figure 5B:
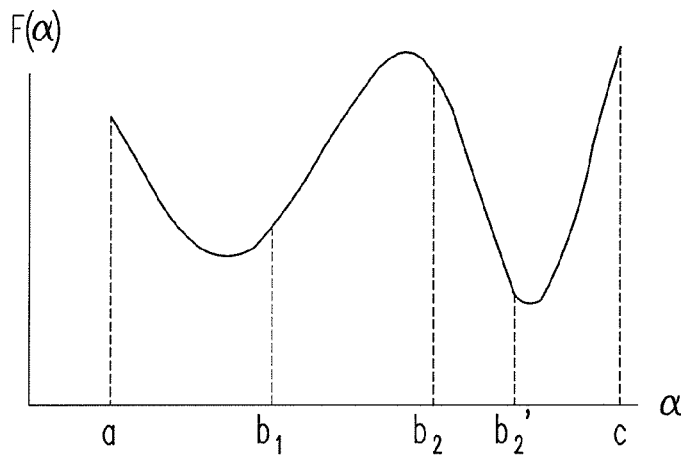

Additionally, it should be noted that the sectional values include two end values and two internal sectional values of the designated range on the $i^{th}$ axis, and the first subspace and the second subspace can be determined by comparing the sectional values so as to reduce the search area. FIG. 5A and FIG. 5B respectively illustrate the curve of a predetermined function within the designated range on the $i^{th}$ axis according to the first embodiment of the disclosure. In the present embodiment, the sectional values are sequentially a, $b_1$, $b_2$, and c, wherein a and c are the two end values of the designated range on the $i^{th}$ axis, and $b_1$ and $b_2$ are two internal sectional values thereof. Besides, it is assumed that $F(a)$, $F(b_1)$, $F(b_2)$, and $F(c)$ are respectively the corresponding values of a, $b_1$, $b_2$, and c in the predetermined function.

Referring to FIG. 5A, when $F(b_1) > F(b_2)$, in the conventional golden section search (GSS) technique, the $i^{th}$ axis of the input designated space is only reduced to $(b_1, c)$, and the recursive search algorithm is executed to the subspace having its $i^{th}$ axis restricted within $(b_1, c)$ (thereinafter, the reduced subspace is referred to simply by the reduced designated range on the $i^{th}$ axis, for example, the subspace obtained by reducing the $i^{th}$ axis of the input designated space to $(b_1, c)$ is referred to as $(b_1, c)$). If the corresponding values of the two end values in the predetermined function are smaller than the corresponding values of the internal sectional values in the predetermined function, there may be local minimums within the ranges between the end values and the sectional values. Thus, in the present embodiment, when $F(b_1) > F(b_2)$, besides serving $(b_1, c)$ as the first subspace, $F(a)$ and the current minimum $F(b_2)$ are further compared to determine whether to serve $(a, b_1)$ as the second subspace, so as to execute the recursive search algorithm respectively to the first subspace and the second subspace.

Thereby, when $F(b_1) > F(b_2)$ and $F(a) < F(b_2)$, $(b_1, c)$ is selected as the first subspace and $(a, b_1)$ is selected as the second subspace, and which are respectively inputted into the recursive search algorithm to search for the local minimums in the first subspace and the second subspace. Contrarily, when $F(b_1) > F(b_2)$ and $F(a) \geq F(b_2)$, only $(b_1, c)$ is selected as the first subspace, while $(a, b_1)$ is not inputted into the recursive search algorithm.

On the other hand, when $F(b_2) > F(b_1)$, in the conventional GSS technique, only $(a, b_2)$ is selected to further execute the recursive search algorithm. In the present embodiment, as shown in FIG. 5A, when $F(b_2) > F(b_1)$ and $F(c) < F(b_1)$, $(a, b_2)$ is selected as the first subspace and $(b_2, c)$ is selected as the second subspace. When $F(b_2) > F(b_1)$ and $F(c) \geq F(b_1)$, only $(a, b_2)$ is selected as the first subspace.

Additionally, the first subspace and the second subspace may also be determined according to internal sectional values. Referring to FIG. 5B, when $F(b_2) > F(b_1)$, $(a, b_2)$ is selected as the first subspace. Meanwhile, a point $b_2'=b_2+\gamma(c-b_2)$ is selected within $(b_2, c)$, and $F(b_2')$ is calculated. If $F(b_2') \geq F(b_1)$, only $(a, b_2)$ is selected as the first subspace. Contrarily, if $F(b_2') < F(b_1)$, $(b_2, c)$ is also selected as the second subspace.

Similarly, when $F(b_1) > F(b_2)$, $(b_1, c)$ is selected as the first subspace, and meanwhile, a point $b_1'=a+\gamma(b_1-a)$ is selected within $(a, b_1)$, and $F(b_1')$ is calculated. If $F(b_1') \geq F(b_2)$, $(b_1, c)$ is selected as the first subspace. Contrarily, if $F(b_1') < F(b_2)$, $(a, b_1)$ is also selected as the second subspace.

Foregoing embodiment may also be applied to the searching of camera external parameters. A global minimum searching system provided by the disclosure will be described below with reference to an embodiment of the disclosure, wherein the external parameters of a camera are calibrated.

Second Embodiment

A 3D model is usually reconstructed by using images obtained by capturing an object from different angles. Accordingly, the external parameters and internal parameters of the camera have to be obtained before the images are captured in order to carry out subsequent process, wherein the internal parameters of the camera are obtained when the camera is manufactured, while the external parameters (including rotation and translation) of the camera have to be calibrated with an object. In the present embodiment, the optimal external parameters are obtained by using two images, and the process will be described in detail below.

Figure 6:
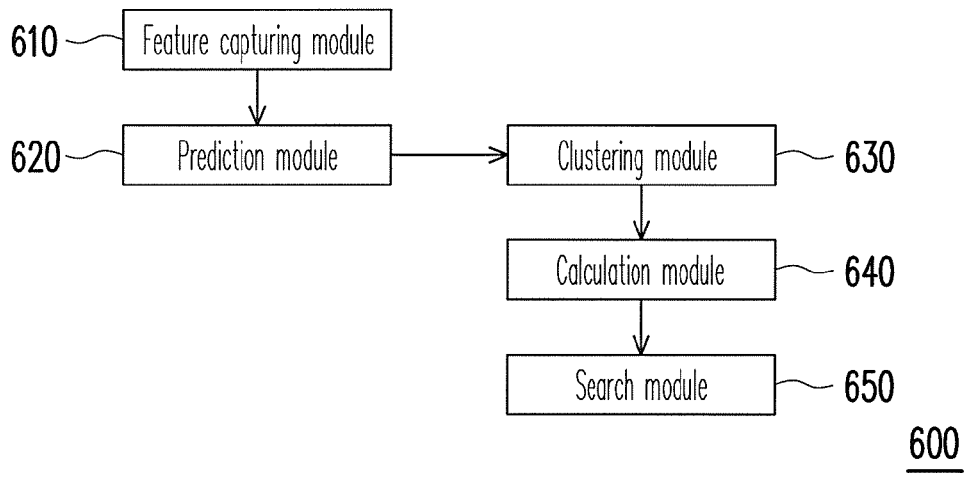
FIG. 6 is a block diagram of a global minimum searching system 600 according to a second embodiment of the disclosure.

FIG. 6 is a block diagram of a global minimum searching system 600 according to the second embodiment of the disclosure. In the present embodiment, the external parameters of a camera are searched for by using the global minimum searching system 600. Referring to FIG. 6, the global minimum searching system 600 includes a feature capturing module 610, a prediction module 620, a clustering module 630, a calculation module 640, and a search module 650, wherein the functions of the clustering module 630, the calculation module 640, and the search module 650 are similar to those of foregoing clustering module 110, calculation module 120, and search module 130 therefore will not be described herein.

The feature capturing module 610 captures a plurality of feature points within two images, wherein the two images are obtained by capturing the same object from different angles. For example, 100 feature points are respectively selected from the two images.

The prediction module 620 calculates a plurality of space points according to the feature points. Namely, a set of external parameters (for example, three rotation parameters and three translation parameters) between the two images are calculated by using these feature points. In a multidimensional space, each rotation parameter and each translation parameter are respectively a value on an axis in the multidimensional space, and accordingly the six values (three rotation parameters and three translation parameters) form a space point in the multidimensional space.

In the present embodiment, the relationship between 3D points in the multidimensional space and the points projected to an image can be expressed as:

$$\begin{pmatrix} u \\ v \\ 1 \end{pmatrix} = M \begin{pmatrix} X \\ Y \\ Z \\ 1 \end{pmatrix} = sK[R \mid T] \begin{pmatrix} X \\ Y \\ Z \\ 1 \end{pmatrix}.$$

In foregoing expression, $(u, v)$ represents a feature point in a 2D space, $(X, Y, Z)$ represents the coordinates the feature point in a 3D space, and M represents a projection matrix. The projection matrix includes three parameters K, R, and T, wherein K is an internal parameter of the camera, R is a rotation parameter among the external parameters, T is a translation parameter among the external parameters, and s is a scale constant. The internal parameter K already exists when the camera is manufactured, namely, K is known. Accordingly, R and T can be solved by obtaining a plurality of $(u, v)$ and $(X, Y, Z)$.

To be specific, the prediction module 620 randomly selects k of the feature points through a robust estimation method and calculates a fundamental matrix between the two images according to the k feature points, so as to obtain a set of the external parameters (i.e., R and T, wherein R and T represent a space point in the multidimensional space). The prediction module 620 repeats foregoing step t times to calculate t space points, wherein t and k are predetermined positive integers. The distance between a projection point obtained by using the external parameters R and T and the original projection point on the image satisfies an evaluation function, and accordingly a corresponding error value can be calculated.

For example, the prediction module 620 randomly selects 8 feature points from a plurality of corresponding feature points (i.e., 8 feature points are selected from the first image and 8 corresponding feature points are selected from the second image) to calculate the fundamental matrix between the two images. Then, an essential matrix is calculated based on the fundamental matrix by using the parameter K, and a set of external parameters R and T (i.e., a space point in the multidimensional space) are obtained by using the essential matrix. This step is repeated to produce enough sets (for example, 4000) of external parameters, wherein a corresponding error value can be obtained by bringing each set of the external parameters into the evaluation function. Besides, the first several sets (for example, first 50) of the external parameters having smaller error values are selected to search for the local minimum.

The robust estimation method may be a least median of squares (LMedS) method, a random sample consensus (RANSAC) method, or a M-estimator method.

While solving the external parameters, the obtained solutions may not be so accurate if the corresponding feature points contain noises or outliers. Herein the operation of randomly selecting the feature points through the LMedS method is repeated to calculate the fundamental matrix, and those solutions having smaller error values are selected from the fundamental matrix. After that, the clustering module 630 clusters these solutions.

In other words, the clustering module 630 selects p space points having the smallest error values from foregoing t space points and defines the p space points as a subclass, so as to perform the clustering operation in the subclass, wherein p is a positive integer smaller than or equal to t.

Figure 7:
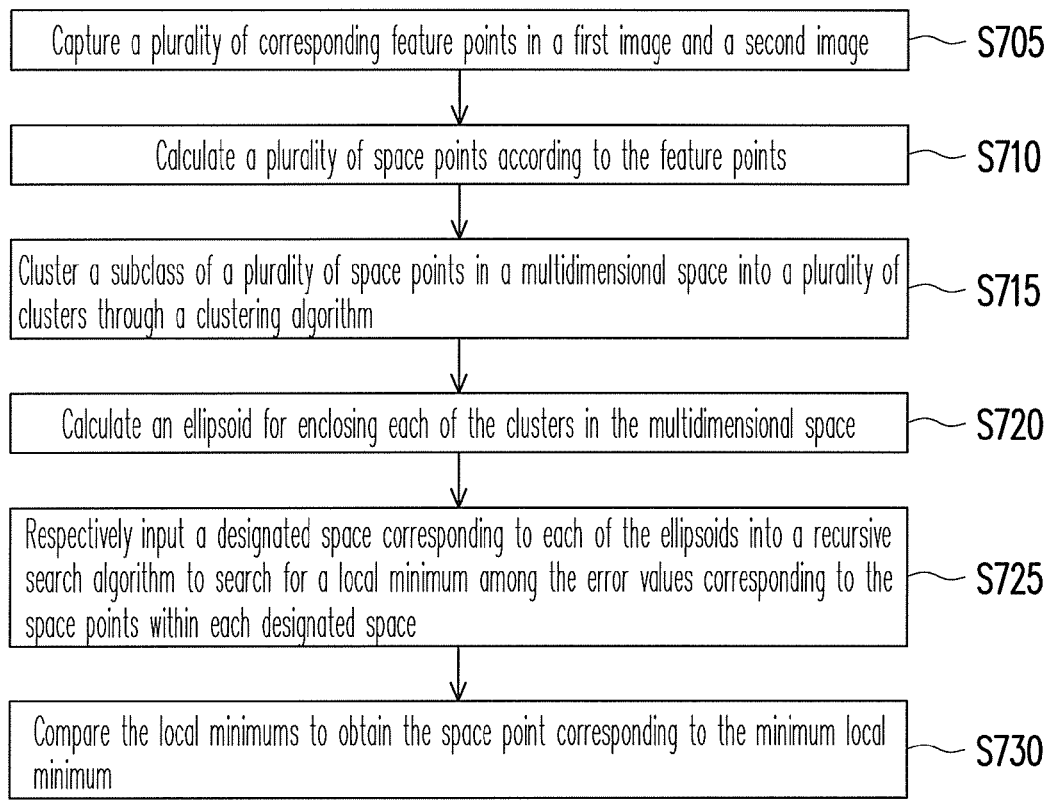
FIG. 7 is a flowchart of a global minimum searching method according to the second embodiment of the disclosure.

The global minimum searching method in the present embodiment will be described in detail with reference to the global minimum searching system 600. FIG. 7 is a flowchart of a global minimum searching method according to the second embodiment of the disclosure. Referring to both FIG. 6 and FIG. 7, in step S705, the feature capturing module 610 captures a plurality of corresponding feature points from two images.

Then, in step S710, the prediction module 620 calculates a plurality of space points according to the feature points. Herein the multidimensional space is a camera parameter space and which can be divided into a rotation space R and a translation space T, wherein the rotation space and the translation space are both 3D spaces. For the convenience of description, the translation space is converted into a 2D space, and accordingly the solution obtained herein will be different from the correct solution for a scale constant; but this conversion will not affect the geometric relationship in the space.

Next, in step S715, the clustering module 630 clusters a subclass of the space points in the multidimensional space into a plurality of clusters through a clustering algorithm.

In step S720, the calculation module 640 respectively calculates an ellipsoid for enclosing each cluster in the multidimensional space. In the present embodiment, because the 3D rotation space R and the 2D translation space T are independent from each other, the two can be processed separately to simplify the calculation. Namely, a covariance matrix of the rotation space R and the translation space T is calculated to obtain the eigenvalues, eigenvectors, and mean values of the rotation space R and the translation space T.

In step S725, the search module 650 respectively inputs a designated space corresponding to each of the ellipsoids into a recursive search algorithm to search for a local minimum among the error values corresponding to the space points in each designated space. The recursive search algorithm in the present embodiment is the same as that in the first embodiment therefore will not be described herein.

For example, assuming the rotation space R includes three axes $R_{last}$, $R_{ver}$, and $R_{hor}$, the translation space T includes two axes $T_{ver}$ and $T_{hor}$, and foregoing five axes are sequentially arranged as $R_{last}$, $R_{hor}$, $R_{ver}$, $T_{hor}$, and $T_{ver}$ according to the eigenvalues thereof calculated by the calculation module 640, then the optimal solution found on the axis $R_{last}$ is the global optimal solution, and the error value corresponding to every point on the axis $R_{last}$ has to be calculated to execute the recursive search algorithm.

The error value corresponding to each point on the axis $R_{last}$ is the minimum found on the axis $R_{hor}$ by fixing the axis $R_{last}$ to a specific value. For example, the error value at the point of $R_{last}$=r3 is the minimum found on the axis $R_{hor}$ by setting $R_{last}$=r3. Similarly, to calculate the error value corresponding to any point on the axis $R_{hor}$, the axis $R_{hor}$ needs to be fixed to a specific value to find the minimum on the axis $R_{ver}$. For example, the minimum is found on the axis $R_{ver}$ through the GSS algorithm by setting $R_{last}$=r3 and $R_{hor}$=r2.

Similarly, the error value of a point r1 on the axis $R_{ver}$ is the minimum obtained in the rotation space T by fixing the rotation space R to (r1, r2, r3). Accordingly, the error value of the point t2 on the axis $T_{ver}$ is the minimum found on the axis $T_{ver}$ by fixing a 4D space to (r1, r2, r3, t2).

The axis $T_{ver}$ has a smaller eigenvalue and the error surface thereof has greater variations. Thus, it is more likely to find a single local minimum on the axis $T_{ver}$. Accordingly, the value found is more accurate. Thereby, the error values used for executing the recursive search on the axis $T_{hor}$ are reliable. Accordingly, the recursive search starts from this level and ends at the axis $R_{last}$.

Finally, in step S730, the search module 650 compares the local minimums to obtain the space point corresponding to the minimum of the local minimums. Namely, the search module 650 compares the local minimums in the ellipsoids and serves the space point corresponding to the minimum of the local minimums as the final solution of the external parameters.

As described above, in the embodiments described above, space points are clustered into a plurality of clusters to search for a local minimum in each of the clusters. Moreover, a global minimum can be searched for in a non-linear space or a non-unimodal function through a revised GSS algorithm.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A global minimum searching method, comprising:
executing a plurality of steps by a computing apparatus, wherein the steps comprise:
clustering a subclass of a plurality of space points in a multidimensional space into a plurality of clusters through a clustering algorithm, wherein each of the space points is corresponding to an error value in an evaluation function;
respectively calculating a plurality of ellipsoids for enclosing the clusters in the multidimensional space;
respectively inputting each designated space corresponding to each of the plurality of ellipsoids into a recursive search algorithm to search for a local minimum among the error values corresponding to the space points within the each designated space; and
comparing the local minimums of the plurality of ellipsoids to obtain the space point corresponding to the minimum of the local minimums.

2. The global minimum searching method according to claim 1, wherein before the step of clustering the subclass of the space points in the multidimensional space into the clusters, the global minimum searching method further comprises:
capturing a plurality of corresponding feature points in a first image and a second image, wherein the first image and the second image are obtained by capturing a same object from different angles; and
calculating the space points according to the feature points.

3. The global minimum searching method according to claim 2, wherein the step of calculating the space points according to the feature points comprises:
randomly selecting k of the feature points through a robust estimation method;
calculating a fundamental matrix between the first image and the second image according to the k feature points, so as to obtain one of the space points; and
repeating the step of randomly selecting k of the feature points t times to calculate t space points, wherein t and k are predetermined positive integers.

4. The global minimum searching method according to claim 3, wherein before the step of clustering the subclass of the space points in the multidimensional space into the clusters, the global minimum searching method further comprises:
selecting p space points having the smallest error values from the t space points and defining the p space points as the subclass, wherein p is a positive integer smaller than or equal to t.

5. The global minimum searching method according to claim 3, wherein the robust estimation method is one of a least median of squares (LMedS) method, a random sample consensus (RANSAC) method, and a M-estimator method.

6. The global minimum searching method according to claim 1, wherein the clustering algorithm is one of a minimum spanning tree (MST) algorithm and a K-means algorithm.

7. The global minimum searching method according to claim 1, wherein each of the ellipsoids comprises N axes, each of the designated spaces is located at a center of the corresponding ellipsoid, each of the designated spaces comprises a designated range on each of the axes of the corresponding ellipsoid, and the N axes of each of the ellipsoids are arranged according to an execution order.

8. The global minimum searching method according to claim 7, wherein the execution order is determined according to an eigenvalue of each of the N axes of each of the ellipsoids.

9. The global minimum searching method according to claim 7, wherein the recursive search algorithm comprises:
receiving an input designated space, wherein the input designated space is a subclass of one of the designated spaces; in the input designated space, all the designated ranges on the axes having their execution orders smaller than i are single values, all the designated ranges on the other axes are value ranges, and i is a positive integer smaller than or equal to N+1; and if the input designated space is equal to one of the designated spaces, i is equal to 1;
if i is equal to N+1, serving the error value corresponding to the input designated space as the local minimum of the input designated space;
if a length of the designated range on the $i^{th}$ axis of the input designated space is smaller than a predetermined threshold, serving a corresponding value of a median within the designated range on the $i^{th}$ axis in a predetermined function as the local minimum of the input designated space;
if the length of the designated range on the $i^{th}$ axis of the input designated space is greater than the predetermined threshold, selecting a plurality of sectional values within the designated range on the $i^{th}$ axis;
comparing a plurality of corresponding values of the sectional values in the predetermined function to select a first subspace or a first subspace and a second subspace in the input designated space;
if only the first subspace is selected, inputting the first subspace into the recursive search algorithm to search for a local minimum of the first subspace, and serving the local minimum of the first subspace as the local minimum of the input designated space; and
if the first subspace and the second subspace are selected, respectively inputting the first subspace and the second subspace into the recursive search algorithm to respectively search for the local minimum in the first subspace and the second subspace, and serving the smaller local minimum as the local minimum of the input designated space.

10. The global minimum searching method according to claim 9, wherein the step of calculating the corresponding value of the predetermined function comprises:
changing the designated range on the $i^{th}$ axis of the input designated space to an input value of the predetermined function to define a third subspace, wherein the input value is one of the median and the sectional values;
inputting the third subspace into the recursive search algorithm to search for a local minimum of the third subspace; and
serving the local minimum of the third subspace as the corresponding value of the predetermined function.

11. The global minimum searching method according to claim 9, wherein the sectional values comprise two end values of the designated range on the $i^{th}$ axis of the input designated space, and the other sectional values are generated according to the two end values and a predetermined ratio.

12. The global minimum searching method according to claim 9, wherein the input designated space is equal to the first subspace plus the second subspace, and a junction between the first subspace and the second subspace on the $i^{th}$ axis of the input designated space is one of the sectional values.

13. A global minimum searching system, comprising:
a clustering module, for clustering a subclass of a plurality of space points in a multidimensional space into a plurality of clusters through a clustering algorithm, wherein each of the space points is corresponding to an error value in an evaluation function;
a calculation module, for respectively calculating a plurality of ellipsoids for enclosing the clusters in the multidimensional space; and
a search module, for respectively inputting each designated space corresponding to each of the plurality of ellipsoids into a recursive search algorithm to search for a local minimum among the error values corresponding to the space points within each of the designated spaces, and comparing the local minimums of the plurality of ellipsoids to obtain the space point corresponding to the minimum of the local minimums.

14. The global minimum searching system according to claim 13 further comprising:
a feature capturing module, for capturing a plurality of corresponding feature points in a first image and a second image, wherein the first image and the second image are obtained by capturing a same object from different angles; and
a prediction module, for calculating the space points according to the feature points,
wherein the prediction module randomly selects k of the feature points through a robust estimation method and calculates a fundamental matrix between the first image and the second image according to the k feature points, so as to obtain one of the space points, and the prediction module repeats the step of randomly selecting k of the feature points t times to calculate t space points, wherein t and k are predetermined positive integers.

15. The global minimum searching system according to claim 14, wherein the robust estimation method is one of a LMedS method, a RANSAC method, and a M-estimator method.

16. The global minimum searching system according to claim 14, wherein the clustering module further selects p space points having the smallest error values from the t space points and defines the p space points as the subclass, wherein p is a positive integer smaller than or equal to t.

17. The global minimum searching system according to claim 16, wherein the clustering algorithm is one of a MST algorithm and a K-means algorithm.

18. The global minimum searching system according to claim 13, wherein each of the ellipsoids comprise N axes, each of the designated spaces is located at a center of the corresponding ellipsoid, each of the designated spaces comprises a designated range on each of the axes of the corresponding ellipsoid, and the N axes of each of the ellipsoids are arranged according to an execution order.

19. The global minimum searching system according to claim 18, wherein the calculation module further calculates an eigenvalue of each of the N axes in each of the ellipsoids to determine the execution order according to the eigenvalues.

20. The global minimum searching system according to claim 18, wherein the recursive search algorithm comprises:
receiving an input designated space, wherein the input designated space is a subclass of one of the designated spaces; in the input designated space, all the designed ranges on the axes having their execution orders smaller than i are single values, all the designated ranges on the other axes are value ranges, and i is a positive integer smaller than or equal to N+1; and if the input designated space is equal to one of the designated spaces, i is equal to 1;

if i is equal to N+1, serving the error value corresponding to the input designated space as the local minimum of the input designated space;

if a length of the designated range on the $i^{th}$ axis of the input designated space is smaller than a predetermined threshold, serving a corresponding value of a median within the designated range on the $i^{th}$ axis in a predetermined function as the local minimum of the input designated space;

if the length of the designated range on the $i^{th}$ axis of the input designated space is greater than the predetermined threshold, selecting a plurality of sectional values within the designated range on the $i^{th}$ axis;

comparing a plurality of corresponding values of the sectional values in the predetermined function to select a first subspace or a first subspace and a second subspace in the input designated space;

if only the first subspace is selected, inputting the first subspace into the recursive search algorithm to search for the local minimum of the first subspace, and serving the local minimum of the first subspace as the local minimum of the input designated space; and if the first subspace and the second subspace are selected, respectively inputting the first subspace and the second subspace into the recursive search algorithm to respectively search for the local minimum in the first subspace and the second subspace, and serving the smaller local minimum as the local minimum of the input designated space.

21. The global minimum searching system according to claim 20, wherein the step of calculating the corresponding value of the predetermined function comprises:

changing the designated range on the $i^{th}$ axis of the input designated space into an input value of the predetermined function to define a third subspace, wherein the input value is one of the median and the sectional values;

inputting the third subspace into the recursive search algorithm to search for a local minimum of the third subspace; and serving the local minimum of the third subspace as the corresponding value of the predetermined function.

22. The global minimum searching system according to claim 20, wherein the sectional values comprise two end values of the designated range on the $i^{th}$ axis of the input designated space, and the other sectional values are generated according to the two end values and a predetermined ratio.

23. The global minimum searching system according to claim 20, wherein the input designated space is equal to the first subspace plus the second subspace, and a junction between the first subspace and the second subspace on the $i^{th}$ axis of the input designated space is one of the sectional values.

* * * * *